Figure 1:
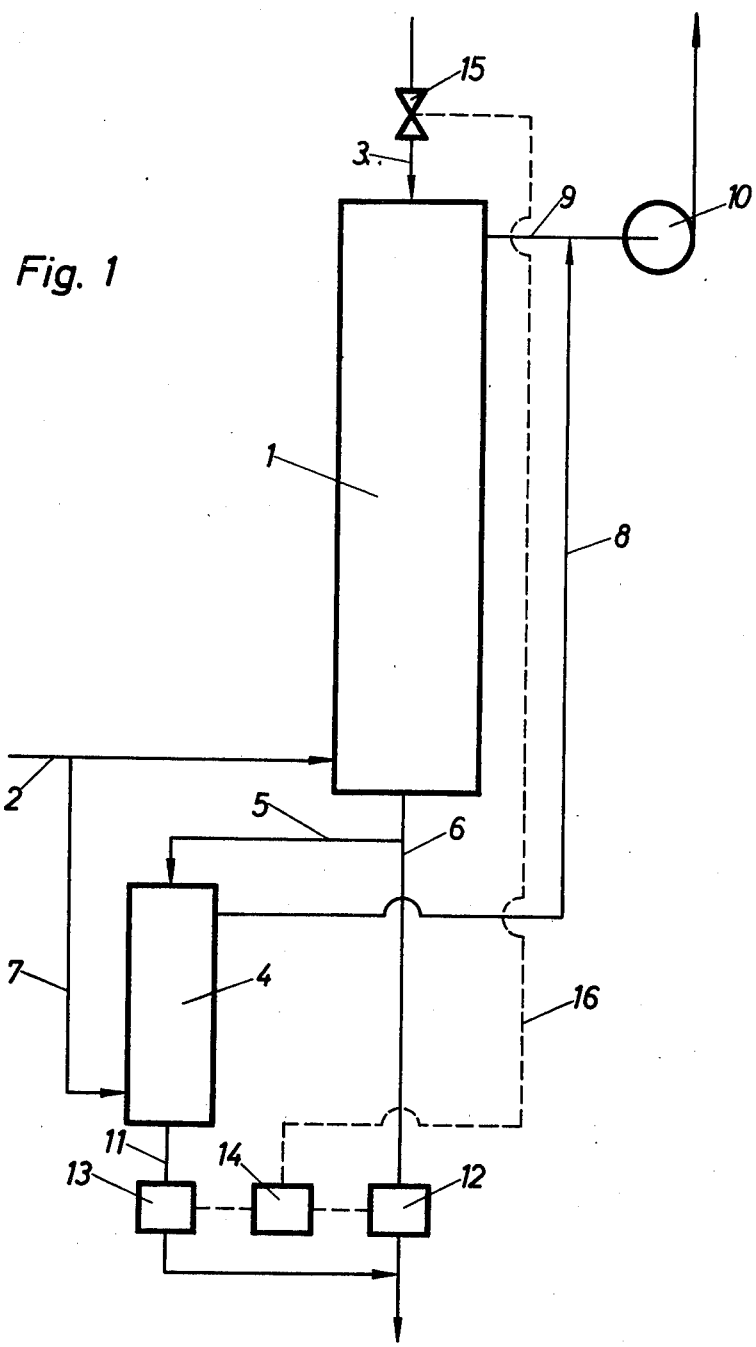

United States Patent [19]

Grill et al.

[11] 4,075,293
[45] Feb. 21, 1978

[54] CONTROL SYSTEM FOR AN ABSORPTION COLUMN

[75] Inventors: Michael Grill, Leoben; Helmut Grohmann; Franz Nössler, both of St. Jakob near Mixnitz, all of Austria

[73] Assignee: Veitscher Magnesitwerke-Actien-Gesellschaft, Vienna, Austria

[21] Appl. No.: 716,012

[22] Filed: Aug. 19, 1976

[30] Foreign Application Priority Data

Aug. 26, 1975 Austria ................................. 6579/75

[51] Int. Cl.² ...................... G01N 9/36; G01N 21/08; G01N 21/12; G01N 21/48
[52] U.S. Cl. .................................. 261/20; 23/230 A; 23/253 R; 73/32 R; 73/61.1 C; 203/3; 364/502
[58] Field of Search ............................ 261/20, 21, 114; 210/96 R, 110, 103; 203/1–3; 235/151.12; 137/110; 73/61.1 C, 61.1 R, 23.1, 32 R, 421.5 R; 55/17–19, 21, 71, 93, 94, 270; 23/230 A, 253 R, 283

[56] References Cited

U.S. PATENT DOCUMENTS

| | | | |
|---|---|---|---|
| 2,225,959 | 12/1940 | Miller | 55/19 |
| 2,617,766 | 11/1952 | Emmett et al. | 210/96 R |
| 3,693,797 | 9/1972 | Topol | 210/96 |
| 3,847,550 | 11/1974 | Scott et al. | 73/61.1 C |
| 3,917,931 | 11/1975 | Sweeney, Jr. | 235/151.12 |

FOREIGN PATENT DOCUMENTS

| | | | |
|---|---|---|---|
| 204,984 | 1/1968 | U.S.S.R. | 55/19 |
| 320,315 | 12/1971 | U.S.S.R. | 55/18 |

Primary Examiner—Tim R. Miles
Assistant Examiner—Gregory N. Clements
Attorney, Agent, or Firm—Kurt Kelman

[57] ABSTRACT

A control for the amount of a gaseous fluid absorbed in a liquid flowing through an absorption column comprises a gage in an outlet from the absorption column for the liquid having the gaseous fluid absorbed therein, an auxiliary absorption column of a substantially smaller capacity than that of the absorption column and receiving a comparatively small amount of the gaseous fluid in addition to the liquid, another gage in an outlet from the auxiliary absorption column for the liquid having the gaseous fluid absorbed therein, the gages measuring respective parameters which are a function of the amount of the gaseous fluid absorbed in the liquid in the respective outlets and producing output signals corresponding to the respective parameters, a comparator connected to the gages for receiving the output signals and comparing them to produce a control signal, and a flow control in the inlet for the gaseous fluid or the liquid of the absorption column, the flow control being connected to the comparator and controlled by the control signal.

21 Claims, 4 Drawing Figures

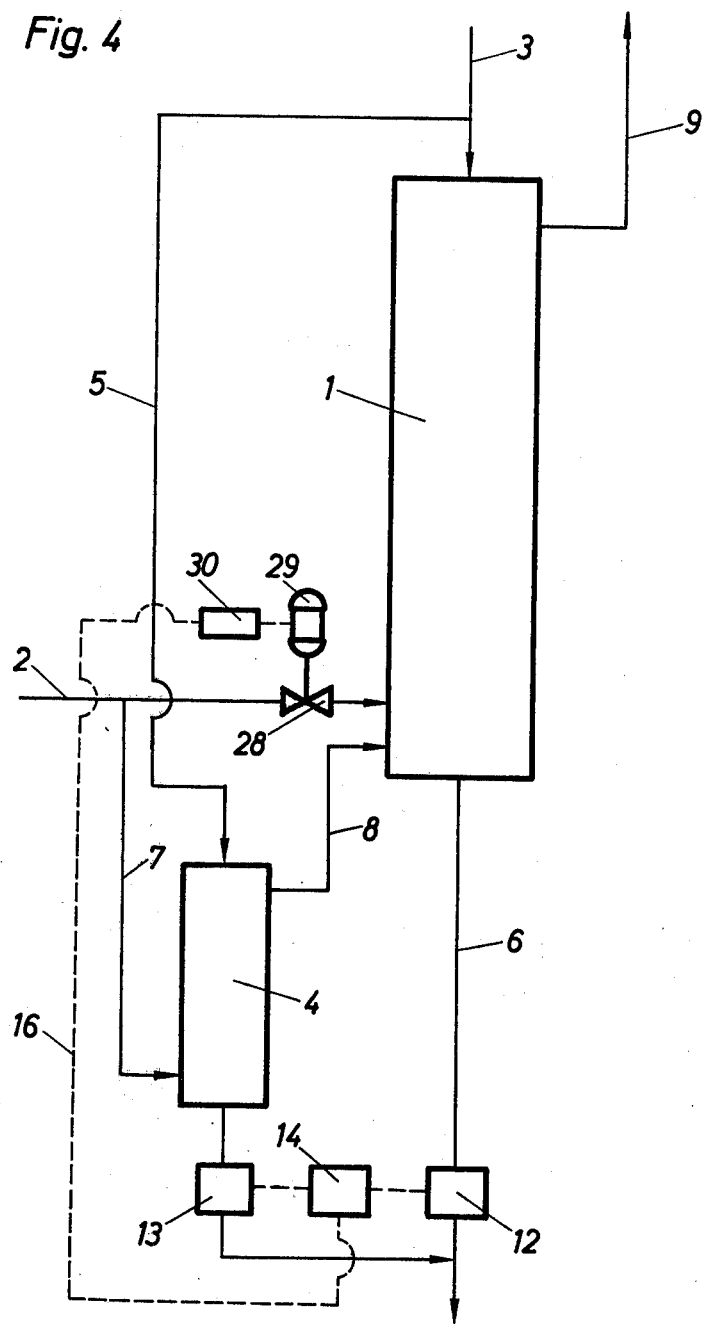

CONTROL SYSTEM FOR AN ABSORPTION COLUMN

The present invention relates to improvements in a control system for an absorption column for absorbing a gaseous fluid in a liquid flowing through the column, such as an adiabatic column for absorption of hydrochloric acid in water from a gaseous mixture containing the hydrochloric acid.

In known control systems of this type, a gage is arranged in an outlet of the absorption column for the liquid having the gaseous fluid absorbed therein and the gage measure a physical parameter which is a function of the amount of the gaseous fluid for the absorption of which the system has been designed, such as the boiling temperature of the liquid in the outlet, and the delivery of the liquid to the liquid inlet of the absorption column is controlled in response to this measured parameter in a manner that a desired value of the physical parameter which is continuously measured in the liquid at the outlet is maintained. Such a control system works generally well when the only variations in the absorption process are connected with the delivery of the gaseous fluid to be absorbed while the liquid is delivered at a constant quality. For instance, this type of control system has been used successfully for the absorption of gaseous hydrochloric acid which is delivered admixed with air to an adiabatic absorption column where it is absorbed by water containing a constant and small amount of impurities. Difficulties have been encountered, however, with such a control system if gases or vapors are to be absorbed in the column by a liquid of varying absorptive capacity, such as water containing different amounts of impurities, which change its absorptive capacity, or if it is desired to make best use of the absorptive capacity of the liquid, for instance to produce an acid of the highest possible concentration in such an absorption process. When it is desired to absorb the entire amount of the gaseous fluid delivered to the absorption column and to make the best possible use of the absorptive capacity of the liquid at the same time, it is necessary also to take into account variations in this absorptive capacity caused, for instance, by a loading of the liquid delivered to the absorption column with impurities which hinder absorption. This is not possible with the known control system described hereinabove.

It is the primary object of this invention to improve such a control system with simple means for constantly maintaining a desired amount of gaseous fluid absorbed in the liquid in the outlet of the absorption column, regardless of changes in any of the operating parameters and more particularly when the absorptive capacity of the liquid changes.

It is a concomitant object of the invention to provide such an improved control system which will maintain a maximum absorption of the gaseous fluid in a liquid loaded with impurities which reduce its absorptive capacity.

The above and other objects are accomplished in accordance with the present invention with a control system for an absorption column for absorbing a gaseous fluid in a liquid flowing through the column, which comprises an inlet means for the gaseous fluid and the liquid, the inlet means including an inlet for the gaseous fluid and an inlet for the liquid, an outlet for the liquid having said gaseous fluid absorbed therein, and a gage in the outlet for measuring a parameter which is a function of the amount of said gaseous fluid absorbed in the liquid and producing an output signal corresponding to this parameter. The invention provides an auxiliary absorption column of a substantially smaller capacity than that of the absorption column. The auxiliary absorption column has an inlet means for delivering the gaseous fluid and the liquid thereto, the inlet means including an inlet for the gaseous fluid arranged to deliver a small amount of the gaseous fluid to the auxiliary absorption column as compared to the amount of the gaseous fluid delivered through the inlet for the absorption column, and an inlet for the liquid, the gaseous fluid being delivered in substantial excess over the absorptive capacity of the gaseous fluid by the liquid, an outlet for the liquid having the gaseous fluid absorbed therein, and another gage in the outlet from the auxiliary absorption column for measuring a parameter which is a function of the amount of said gaseous fluid absorbed in the liquid coming from the auxiliary absorption column and producing an output signal corresponding to this parameter. A comparator has input means connected to the gages for receiving the output signals thereof and compares the output signals to produce a control signal at the output of the comparator, and a flow control in the inlet means of the absorption column is connected to the output of the comparator and is controlled by the control signal.

Such a control system fully attains the objects set forth hereinabove and the amount of gaseous fluid absorbed in the liquid may not only be maintained constant but it may also be so adjusted that the entire amount of gaseous fluid delivered to the absorption column is absorbed in the liquid and none is exhausted to the surrounding atmosphere to pollute the same.

The above and other objects, advantages and features of this invention will become more apparent from the following detailed description of certain now preferred embodiments thereof, taken in conjunction with the accompanying diagrammatic drawing wherein FIGS. 1 to 4 show four different embodiments of a control system according to the present invention.

Referring now to the drawing, wherein like reference numerals designate like parts functioning in a like manner to avoid redundancy in the description, FIG. 1 illustrates a control system for main absorption column 1 for absorbing a gaseous fluid in a liquid flowing through the column. In the illustrated embodiment, the system is applied to an adiabatic HCl absorption column which has an inlet means for the gaseous fluid, i.e. a gaseous mixture of inert gases and hydrogen chloride gas, and the liquid, i.e. water, the inlet means including inlet 2 for the gaseous fluid and inlet 3 for the liquid. The liquid may be water containing various amounts of impurities which reduce its absorptive capacity for hydrogen chloride gas, such as chlorides. Main absorption column 1 has outlet 6 for the liquid having therein the gaseous fluid to be absorbed.

The illustrated control system comprises auxiliary absorption column 4 which has an inlet means for delivering the gaseous fluid and the liquid to thereto. The inlet means includes inlet 7 for the gaseous fluid arranged to deliver a small amount of the gaseous fluid to the auxiliary absorption column as compared to the amount of the gaseous fluid delivered through inlet 2 for main absorption column 1, and inlet 5 for the liquid, the gaseous fluid being delivered in substantial excess over the absorptive capacity of the gaseous fluid by the liquid.

In the embodiment of FIG. 1, liquid inlet 5 for auxiliary absorption column 4 is connected to outlet 6 of the liquid of main absorption column 1 whereby the liquid delivered to the auxiliary absorption column is a small portion of the liquid coming from the main absorption column. This provides not only a very simple construction but has the additional advantage that, even under greatly varying operation conditions and with a structure of the auxiliary column which differs from that of the main absorption column with respect to their absorption characteristics, the pressure and the temperature in at least the outlet region of the main absorption column, which is decisive for the amount of absorbed gaseous fluid, are substantially the same as those in the auxiliary absorption column. This provides excellent control for the concentration of the absorbed gaseous fluid in the liquid coming from the main absorption column. The substantial balance of temperature and pressure in the main and auxiliary absorption columns are of special advantage where the maximum amount of gaseous fluid which can be absorbed by the liquid depends primarily on the pressure and/or temperature conditions. With such a balance, the measured parameters in the outlets of the auxiliary and main absorption columns may be very simply compared and the comparison value used to control the absorption in the main column.

Residual, non-absorbed gaseous fluid leaves auxiliary absorption column 4 through exhaust conduit 8 which leads into exhaust conduit 9 through which non-absorbed gaseous fluid escapes from main absorption column 1. Such residual non-absorbed gas may be an inert gas, e.g. ambient air delivered together with gas to be absorbed to the main column 1. The gas flow is forced through the columns by exhaust ventilator 10 mounted in exhaust conduit 9. Because of the very small amounts of gas delivered to auxiliary column which are further reduced by absorption in the auxiliary column from this amounts of gas practically no pollution of the surrounding atmosphere occurs.

Auxiliary absorption column 4 has outlet 11 for the liquid having the gaseous fluid absorbed therein and gages 12 and 13 are mounted respectively in outlets 6 and 11 for measuring parameters which are respective functions of the amount of gaseous fluid absorbed in the liquid coming from the respective columns and producing respective output signals corresponding to these parameters. The gages may be designed to measure a physical or a chemical parameter indicating the concentration of the gaseous fluid absorbed in the liquid, and densimeters measuring the density of the liquid in the outlets and producing electrical output signals are useful gages. Using the density of the liquid in the outlets of the auxiliary and main absorption columns as criteria for the control of the absorption in the main column provides a very simple construction. However, it is also possible to use such values as the boiling point of the liquids or their refractive index as physical parameters, or such chemical parameters as the pH-value of the liquids. Thus, the type of gage used in the control system may be widely varied as long as it indicates the concentration of absorbed gaseous fluid in the liquid. If densimeters are used, they may consist of floating gages whose immersion depth in the outflowing liquid indicates the density thereof, the pivoting of the floating gage being converted into an electrical signal. It is also possible to measure the liquid density pneumatically by immersion of a pipe into the liquid and passing a weak gas stream through the pipe whose pressure is used to measure the density of the liquid. If the boiling point of the liquid is used as the measured parameter indicating the gaseous fluid concentration in the liquid, the gages may have heaters and the boiling point of the liquid is measured with an electric thermometer whose output signals are used in the control.

Whatever type of gage is used in the control system, the output signals of gages 12 and 13 are received by the input means of a comparator 14 connected tp the gages, these output signals are compared in the comparator and the comparison produces a control signal at the output of the comparator. A flow control is arranged in the inlet means of main absorption column 1 and is connected to the output of comparator 14 to be controlled by the control signals coming therefrom. In the embodiment of FIG. 1, the flow control is control valve 15 arranged in inlet 3 for the liquid of main absorption column 1, the valve being a solenoid valve connected to the output of comparator 14 by control circuit line 16. This arrangement provides a particularly simple construction for the control of the liquid input from a storage tank since this liquid input will be controlled directly by the control signal of the comparator whose output is connected directly or via a signal converter to the solenoid valve.

The system illustrated in FIG. 2 operates in the same manner as that of FIG. 1, except with respect to those parts hereinbelow described.

As shown, in this embodiment liquid inlet 5 of auxiliary absorption column 4 is connected to liquid inlet 3 of main absorption column 1 whereby the liquid delivered to the auxiliary absorption column is the same as that delivered to the main absorption column. This arrangement assures that the absorption in the auxiliary column proceeds substantially along the same lines as in the main column, which makes it possible to operate with a minimal gaseous fluid excess in the auxiliary column and to obtain very rapid control.

With this type of liquid feed to the main and auxiliary absorption columns, the temperatures of the liquid in the columns, particularly in the outlet regions, may differ from each other, due to the differences in the dimensions of the columns and the concomitant differences in the dwell time of the liquid in the respective columns. To equalize the temperatures, means are preferably provided for adjusting the temperature of auxiliary absorption colunn 4, the illustrated means being heat exchange jacket 20 surrounding the auxiliary column. Depending on whether a heating or cooling medium is used, the auxiliary absorption column will be heated or cooled to adjust its temperature to that prevailing in the main column. This arrangement will be of particular advantage in systems wherein the height of the auxiliary absorption column is low relative to that of the main column and when the temperature is of substantial importance in the absorption process.

Figure 2:
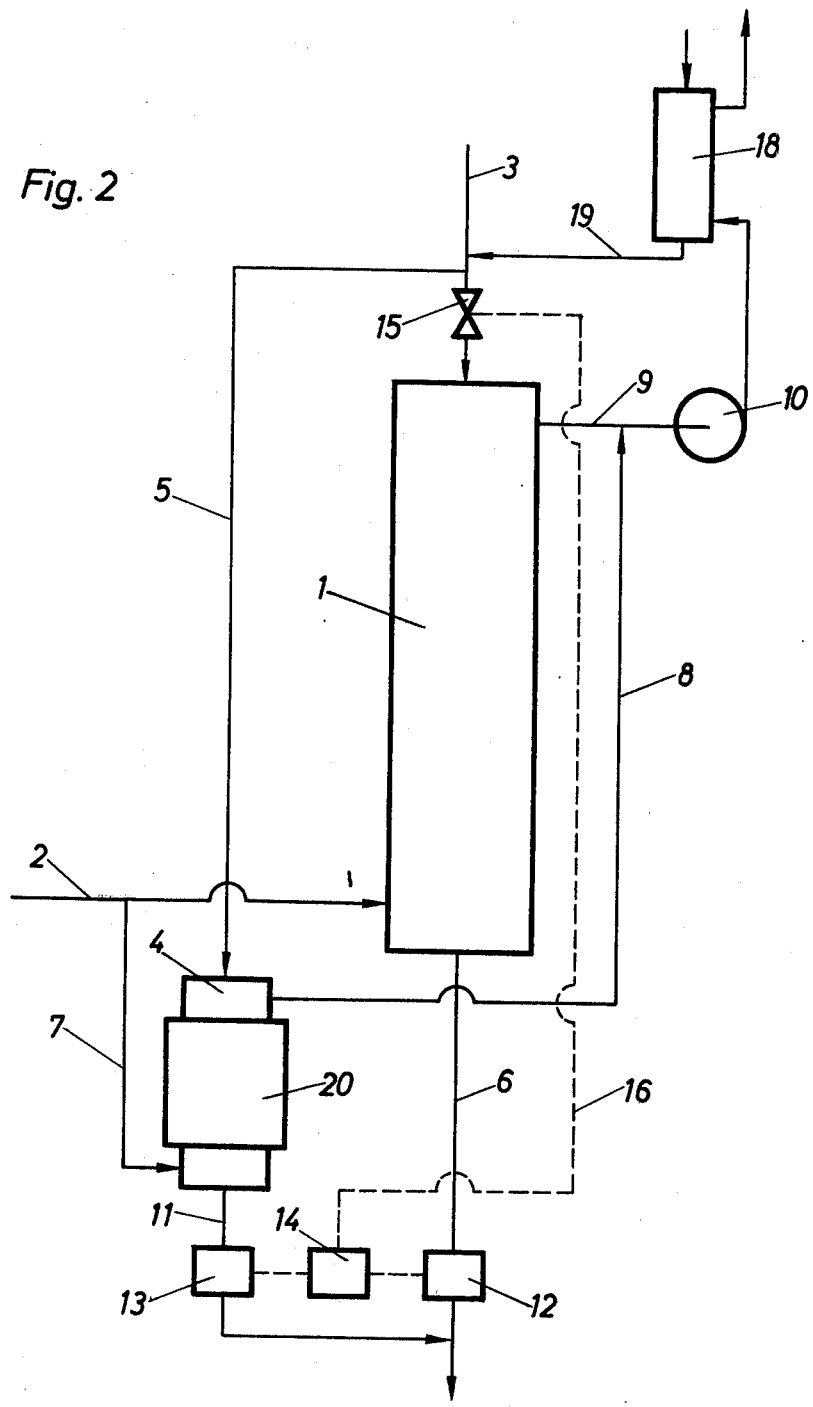

As illustrated, the control system of FIG. 2 further comprises an auxiliary absorber 18 arranged in exhaust conduit 9 of main absorption column 1. Non-absorbed gaseous fluid escaping through exhaust conduit 9 and exhaust conduit 8 is thus absorbed in the auxiliary absorber 18 rather than polluting the environment. Auxiliary absorber 18 has outlet 19 for liquid connected to liquid inlet 3 of the main absorption column, the gaseous fluid escaping through exhaust conduits 8 and 9 being thus absorbed in the liquid in the auxiliary absorber and recycled to the main column.

In the embodiments of FIG. 3 which, again, operates analogously to that of FIG. 1, except for the noted exceptions, liquid inlet valve 15 is replaced by pump 26. The liquid flow control pump 26 is driven by motor 25 which is controlled from control instrument or signal converter 24 connected by control circuit line 16 to the output of comparator 14.

In this embodiment, auxiliary absorption column 4 is arranged in a gaseous fluid branch loop consisting of auxiliary gaseous fluid inlet 7 branching off main gaseous fluid inlet 2 and auxiliary gaseous fluid exhaust conduit 8 returning to main inlet 2. The gaseous fluid flow through the auxiliary absorption column is readily controlled by arranging adjustable ventilator 22 in the loop, this ventilator being mounted in exhaust conduit 8 in the illustrated embodiment. Adjustmend of the ventilator will regulate the gaseous fluid flow through auxiliary column 4. However, such a ventilator is not essential if inlet conduit 2 and 7 are so configured as to permit the desired gas flow through the auxiliary absorption column. With this arrangement, the gaseous fluid exhausted from the auxiliary column will neither be recycled or disgorged into ambient atmosphere but will enter the main absorption column. In view of the pressure conditions in the main and auxiliary columns, it is advantageous to arrange the auxiliary column near the inlet for the gaseous fluid of the main column. The illustrated branch loop arrangement connected to the main gaseous fluid inlet provides a particularly simple construction.

As the embodiment of FIG. 2 in the embodiment of FIG. 4 liquid inlet 5 for the auxiliary absorption column is connected to liquid inlet 3 for the main absorption column. In this embodiment and contrary to the arrangements shown in FIGS. 1 to 3, the absorption of a gaseous fluid in a liquid passing through main column 1 is controlled not by controlling the inflow of the liquid into the main column but by controlling the inflow to the gaseous fluid through inlet 2 into main absorption column 1. The gaseous fluid is generally delivered in a gaseous mixture with inert gases and the flow thereof into the main column is controlled by control valve 28 arranged in inlet 2. The control valve is operated by servomotor 29 whose operation is controlled by control instrument 30 connected by line 16 to the output of comparator 14.

Figure 3:
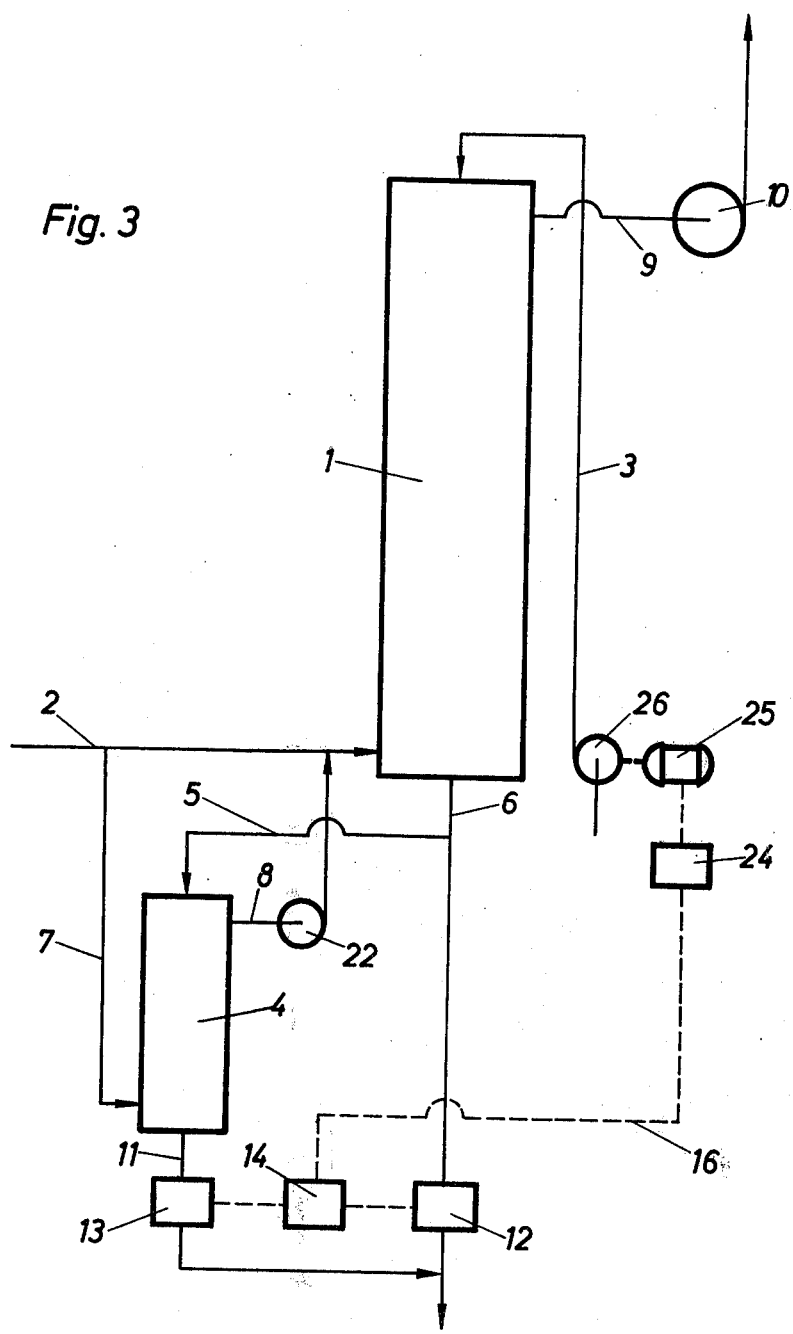

With an effect similar to that of FIG. 3, exhaust conduit 8 of auxiliary column 4 is connected to main absorption column 1 to deliver the exhausted gaseous fluid thereto, rather than permitting it to escape to the atmosphere or to be recycled.

The control system of the present invention will have a particularly good adjustability and escape of gaseous fluid will be minimized or prevented when the comparator and/or the gages are adjusted to control the amount of the gaseous fluid absorbed in the liquid in the outlet of the main absorption column to a value below that of the gaseous fluid absorbed in the liquid in the outlet from the auxiliary absorption column. However, when it is desired to attain the highest possible concentration of the gaseous fluid in the liquid absorbing it, as is often the case in the production of acids, it will be advantageous to adjust the comparator and/or the gages so as to control the amount of the gaseous fluid absorbed in the liquid in the outlet of the main absorption column to the value of the gaseous fluid absorbed in the liquid in the outlet from the auxiliary absorption column. In this case, the use of an auxiliary absorber, such as absorber 18 in the embodiment of FIG. 2, is particularly useful to avoid undesired escape of gaseous fluid from the main column into the surrounding atmosphere.

While the above described control system has been used with particular advantage in adiabatic absorption columns for the absorption of hydrochloric acid gas in water, which may contain impurities which change the absorption capacity of the water, it is by no means limited to such use but may be effectively utilized for the control of any absorption column wherein a gas or vapor is to be absorbed in a liquid. Thus, the system may be used in installations wherein $SO_2$ or $SO_3$ is to be absorbed in a lime solution or water, for example, or in installations serving for the absorption of chlorine in caustic soda solution.

What is claimed is:

1. A control system for an absorption column for absorbing a gaseous fluid in a liquid flowing through the column, comprising
   a. inlet means for the gaseous fluid and the liquid, the inlet means including
      1. an inlet for the gaseous fluid and
      2. an inlet for the liquid,
   b. an outlet for the liquid having said gaseous fluid absorbed therein,
   c. a gage in the outlet for measuring a parameter which is a function of the amount of said gaseous fluid absorbed in the liquid and producing an output signal corresponding to said parameter,
   d. an auxiliary absorption column of a substantially smaller capacity than that of the absorption column,
   e. an inlet means for delivering the gaseous fluid and the liquid to the auxiliary absorption column, said inlet means including
      1. an inlet for the gaseous fluid arranged to deliver a small amount of the gaseous fluid to the auxiliary absorption column as compared to the amount of the gaseous fluid delivered through the inlet for the absorption column and
      2. an inlet for the liquid, the gaseous fluid being delivered in substantial excess over the absorptive capacity of the gaseous fluid by the liquid,
   f. an outlet from the auxiliary absorption column for the liquid having the gaseous fluid absorbed therein,
   g. another gage in the outlet from the auxiliary absorption column for measuring a parameter which is a function of the amount of said gaseous fluid absorbed in the liquid coming from the auxiliary absorption column and producing an output signal corresponding to this parameter,
   h. a comparator having input means and an output, the input means being connected to the gages for receiving the output signals thereof, the output signals being compared in the comparator and the comparison producing a control signal at the output of the comparator, and
   i. a flow control in the inlet means of the absorption column connected to the output of the comparator and being controlled by the control signal.

2. The control system of claim 1, wherein the pressure and temperature in at least the outlet region of the absorption column are substantially the same as those in the auxiliary absorption column.

3. The control system of claim 1, wherein the flow control is arranged in the inlet for the liquid of the absorption column.

4. The control system of claim 3, wherein the flow control comprises a control valve.

5. The control system of claim 3, wherein the flow control comprises a pump.

6. The control system of claim 1, wherein the gages are densimeters for measuring the density of the liquid in the outlets.

7. The control system of claim 1, wherein the inlet for the liquid of the auxiliary absorption column is connected to the outlet of the liquid of the absorption column whereby the liquid delivered to the auxiliary absorption column is the liquid coming from the absorption column.

8. The control system of claim 1, wherein the inlet for the liquid of the auxiliary absorption column is connected to the inlet of the liquid of the absorption column whereby the liquid delivered to the auxiliary absorption column is the liquid delivered to the absorption column.

9. The control system of claim 1, further comprising means for adjusting the temperature of the auxiliary absorption column.

10. The control system of claim 1, further comprising a gaseous fluid exhaust conduit for the absorption column and another gaseous fluid exhaust conduit for the auxiliary absorption column.

11. The control system of claim 10, wherein the other gaseous fluid exhaust conduit is connected to the exhaust conduit for the absorption column.

12. The control system of claim 10, wherein the other gaseous fluid exhaust conduit is connected to the gaseous fluid inlet for the absorption column.

13. The control system of claim 10, wherein the other gaseous fluid exhaust conduit is connected to the absorption column to deliver gaseous fluid from the other exhaust conduit to the absorption column.

14. The control system of claim 1, wherein the auxiliary absorption column is arranged near the inlet for the gaseous fluid of the absorption column.

15. The control system of claim 14, wherein the inlet for the gaseous fluid of the auxiliary absorption column in a conduit branching off from the gaseous fluid inlet pipe of the absorption column and the exhaust conduit of the auxiliary absorption column is returning to the inlet of the absorption column.

16. The control system of claim 15, further comprising an exhaust ventilator arranged in the branch loop consisting of the gas inlet conduit for the auxiliary absorption column and of the exhaust conduit of the auxiliary absorption column.

17. The control system of claim 1, wherein the comparator and/or the gages are adjusted to control the amount of the gaseous fluid absorbed in the liquid in the outlet from the absorption column to a value below that of the gaseous fluid absorbed in the liquid in the outlet from the auxiliary absorption column.

18. The control system of claim 1, wherein the comparator and/or the gages are adjusted to control the amount of the gaseous fluid absorbed in the liquid in the outlet from the absorption column to the value of the gaseous fluid absorbed in the liquid in the outlet from the auxiliary absorption column.

19. The control system of claim 18, further comprising an auxiliary absorber arranged in the exhaust conduit of the absorption column, this auxiliary absorber having an outlet for liquid connected to the liquid inlet of the absorption column.

20. The control system of claim 1, wherein the gaseous fluid comprises hydrochloric acid and the liquid is water.

21. The control system of claim 1, wherein the flow control is arranged in the inlet for the gaseous fluid of the absorption column.

* * * * *